Jan. 23, 1934.  R. T. GILLETTE ET AL  1,944,863
WELDING MACHINE
Filed June 22, 1933  2 Sheets-Sheet 1

Inventors:
Robert T. Gillette,
Laurence R. Leveen,
by Harry E. Dunham
Their Attorney.

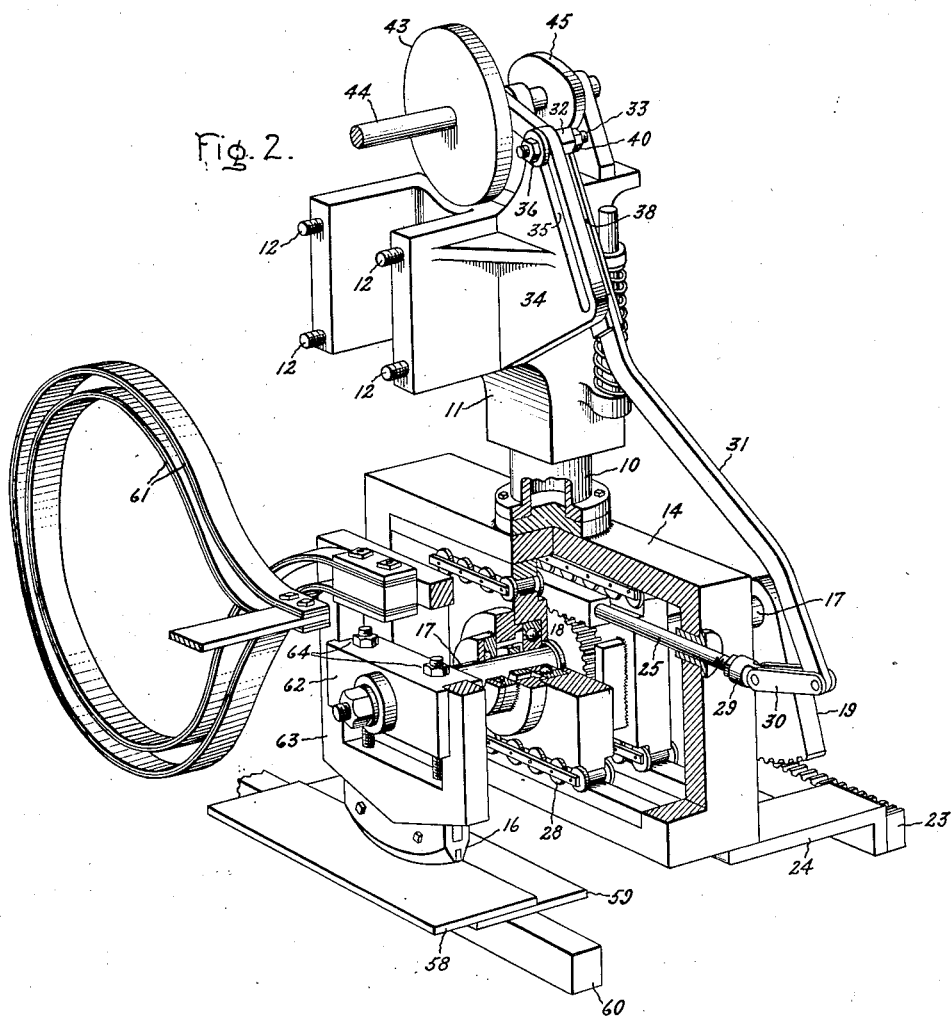

Patented Jan. 23, 1934

1,944,863

UNITED STATES PATENT OFFICE 1,944,863

WELDING MACHINE

Robert T. Gillette and Laurence R. Leveen, Scotia, N. Y., assignors to General Electric Company, a corporation of New York Application June 22, 1933. Serial No. 677,058

11 Claims. (Cl. 219—4)

Our invention relates to that form of electric welding known as resistance line welding wherein work parts are joined to one another by the application of heating current and pressure progressively along a selected line of contact at which it is desired to produce the weld.

It is an object of our invention to provide apparatus for rapidly making line welds of limited length.

It is a further object of our invention to provide apparatus for converting spot welding machines into line welding machines capable of producing welds of limited length.

Figure 1:
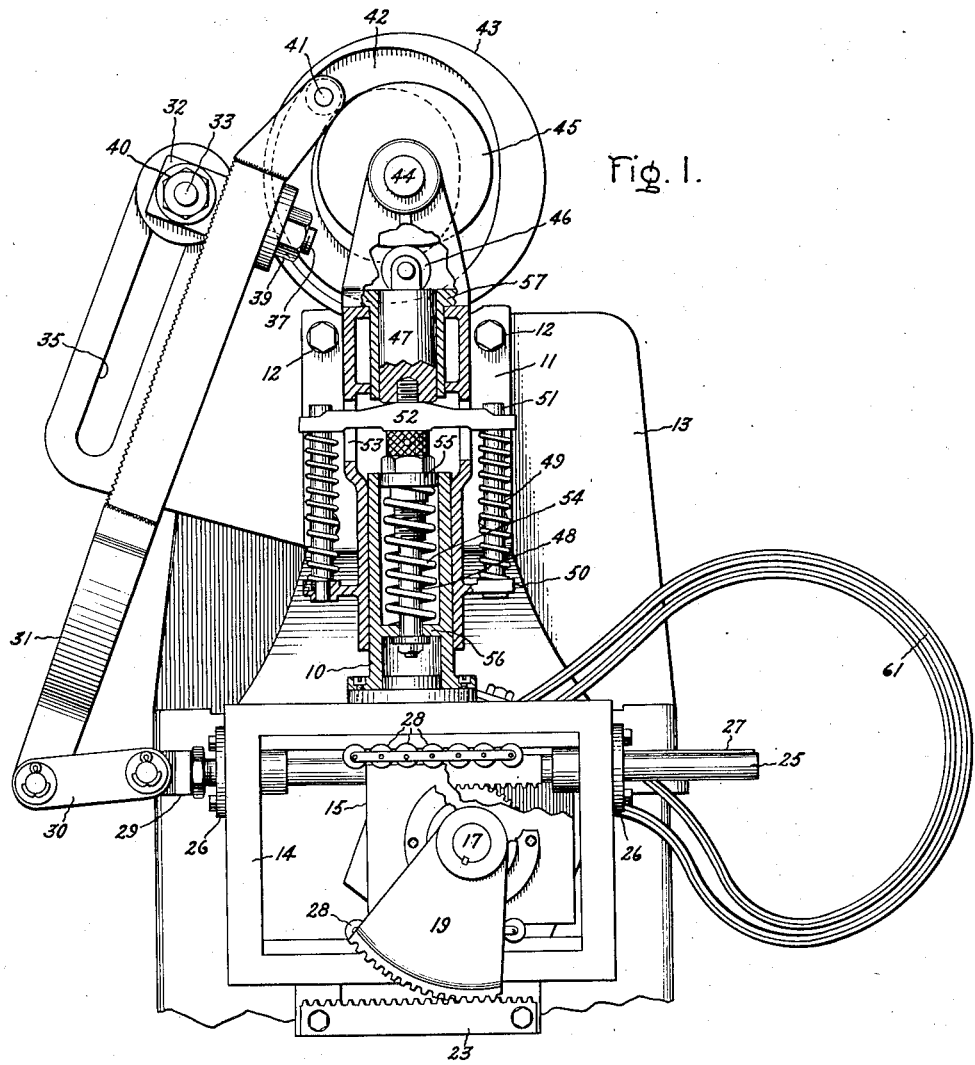
Figure 3:
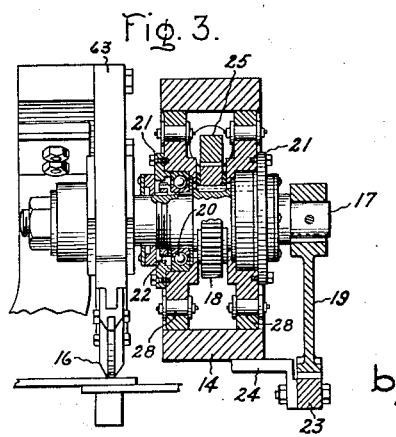

Further objects of our invention will become apparent from a consideration of the following description taken in connection with the accompanying drawings, Fig. 1 and 2 of which show front and perspective views partly in section of one embodiment thereof, and Fig. 3 of which shows a sectional view of the slide forming part of the apparatus illustrated in Figs. 1 and 2.

Since our invention is in the nature of an attachment which may be used for converting spot welding machines into line welding machines, the illustrations in the drawings have been limited to that portion of the machine embodying our invention. In these drawings the welding head is attached to the lower end of a piston like plunger 10 which is guided vertically in a support 11. This support is attached by bolts 12 to the frame 13 of the welding machine. The welding head comprises a carrier 14 for a slide 15 by means of which the electrode 16 is supported. This electrode is attached to one end of a shaft 17 which acts as a support for gears 18 and 19 which are also attached to this shaft. This shaft is supported in slide 15 by ball bearings 20 which are held in place in the slide by covers 21. The shaft is held in adjusted position relative to these bearings by nuts 22 supported thereon and engaging the bearings 20. Gear 19 engages a rack 23 attached by brackets 24 to the frame of the carrier 14. Gear 18 is enclosed within the slide 15 and is engaged by a rack bar 25. The ends of this rack bar are supported in bushings 26 which are in turn supported by the carrier 14. Turning of the rack bar 25 in its bushings is prevented by a key 27, the bushing 26 enclosing that portion of the rack bar in which the key is located being slotted to accommodate the key. Free movement of the slide 15 along a path parallel to the work is facilitated by anti-friction rollers 28 inserted between the slide and the guiding means forming part of the carrier 14.

The rack bar 25 is connected through a clevis 29 and a link 30 to the lower end of a lever 31 which is fulcrumed by means of a block 32 and a stud 33 to a web portion 34 of the support 11. Stud 33 is located in a slot 35 and may be clamped in a predetermined adjusted position in this slot by means of a nut 36. Block 32 is provided with a stud 37 which extends through an elongated opening 38 in the lever 31 to which the block may be clamped by means of a nut 39. Block 32 is held on stud 33 by a nut 40. The other end of lever 31 is provided with a cam follower 41 which engages a cam slot 42 in a disk 43 which is attached to a driving shaft 44.

A cam 45 also attached to the driving shaft 44 is provided for operating the plunger 10 to which the welding head is attached. This cam operates through a cam follower 46 and rods 47 and 48 to move the plunger 10 against the action of the lifting springs 49. These springs are supported on studs 50 which also support bars 51 which act as guides for the cross-arm 52 the mid-portion of which is secured to the plunger rods 47 and 48 and the ends of which extend through openings 53 in the support 11. The plunger rod 48 acts against the plunger 10 through a spring 54 one end of which engages the plunger bar through a washer 55 and the other end of which engages a diaphragm 56 located within the plunger. The plunger bar 48 extends through this diaphragm and is provided with a bolt and washer by means of which the upward movement thereof may be imparted to the plunger 10. The plunger rod 47 is guided by a bushing 57 located in the upper portion of the support 11.

The work to be welded, 58 and 59, is supported on an electrode 60 located beneath the electrode 16 with which it cooperates. The electrodes 16 and 60 are connected to the terminals of a welding transformer by conductors one of which, 61, is illustrated in the drawings. This conductor is made of flexible material and looped in order to accommodate the reciprocating and rotating movement of the electrode 16.

Electrode 16 is adjustably supported by means of a block 62 and a frame 63 which may be adjusted relatively to one another through the agency of adjusting screws 64. The block 62 is attached to the above-mentioned shaft 17, and the electrode 16 is supported on the frame 63 to which the conductor 61 is attached. The electrode 16 may be insulated from the shaft 17 although this is not necessary.

The operation of the apparatus described above is as follows:—The carrier 14 is moved to and from the work through the agency of cam 45 which acts on the plunger 10 through follower 46 and rods 47 and 48 against the action of lifting springs 49 which hold the cam follower in engagement with the cam. When the plunger rods 47 and 48 are depressed through the action of cam 45, the electrode 16 is depressed until it makes contact with the work when further depression of the rods moves rod 48 through the diaphragm 56 of plunger 48 compressing spring 54 and thus merely increasing the pressure with which electrode 16 is held against the work. The slide 15 is moved to and fro in the carrier 14 by rack bar 25 which is connected through lever 31 and cam follower 41 to cam 42 located on the same shaft 44 as the operating cam 45 for the plunger 10 to which the carrier 14 is attached. Rack bar 25 engages gear 18 supported on shaft 17 and the movement of rack bar 25 in carrier 14 causes shaft 17 to rotate about its axis. The rotation of shaft 17 also rotates gear 19 which engages rack 23 attached to the carrier 14. This propels the slide 15 along the guides in carrier 17 and traverses the electrode 16 along the work at the same time the electrode is rotated by reason of the rotation imparted to the shaft 17. The cams 42 and 45 have configurations and are adjusted relatively to one another on the driving shaft 44 to move the slide 15 in a predetermined direction along the guiding means in the carrier 14 when the carrier has been moved toward the work and the electrode is held in engagement therewith for a predetermined time during the reciprocating motion of said carrier. The configuration and adjustment of the cams are such that the slide 15 is returned to its initial position during the reciprocating motion of the carrier 14 which occurs after the welding operation has been completed. When the electrode 16 has been raised the work is free to be adjusted to a new position where it is desired to make another short line weld of the character for which our apparatus is particularly suited. The travel of the slide 15 and the length of the weld produced may be adjusted by adjusting the fulcrum point of the lever 31. This is accomplished by adjusting the fulcrum stud 33 along the slot 35 and the fulcrum block 32 along the lever 31.

It will be noted that the apparatus above described may be used for converting a spot welding machine into a machine suitable for making line welds of short lengths. All that is necessary to effect this substitution is to detach the spot welding electrode carrier from its supporting plunger and substitute in place thereof a carrier and controlling mechanism such as described above.

The apparatus above described is particularly suited for performing resistance line welding operations. Its use, however, is not limited to welding. It may be used for soldering or brazing and may also be used for applying pressure progressively along a selected line of contact. Consequently, it is to be understood that our invention is not limited solely to resistance line welding, but may be used for other purposes.

Furthermore, it is to be understood that although in the arrangement illustrated the carrier is moved along a path parallel to the work our invention is not limited to such an arrangement since the carrier may be moved in any direction transverse to the reciprocating motion of the carrier. Furthermore, instead of the cam mechanism employed, other actuators may be employed for imparting a reciprocating motion to the carrier and for moving the slide in the carrier transverse to the reciprocating motion of the carrier. The work engaging surface of the work engaging member or electrode referred to above may be variously modified to accommodate itself to the configuration of the work part with which it is adapted to make engagement. The particular member illustrated and described above may for convenience be referred to as a line welding electrode.

While we have shown and described for the purpose of illustration one specific embodiment of our invention, modifications thereof will occur to those skilled in the art in view of the arrangement illustrated, and we, therefore, aim in the appended claims to cover all such modifications as fall within the true spirit and scope of our invention.

What we claim as new and desire to secure by Letters Patent of the United States, is:

1. Apparatus comprising a slide, a work engaging member supported on said slide, means for guiding said slide along a path parallel to the work, and means for moving said guiding means toward and away from the work and said slide along said guiding means in one direction when said work engaging member is in contact with the work and in the opposite direction when said work engaging member is out of engagement with the work.

2. Apparatus comprising a slide, a work engaging member, means on said slide for adjusting said work engaging member toward and away from the work, means for guiding said slide along a path parallel to the work, and means for moving said guiding means toward and away from the work and said slide along said guiding means in one direction when said work engaging member is in contact with the work and in the opposite direction when said work engaging member is out of engagement with the work.

3. Welding apparatus comprising a carrier, a slide in said carrier, means for guiding said slide along a path parallel to the work, an electrode supported on said slide, means for reciprocating said carrier relatively to the work and for holding said electrode in engagement with the work for a predetermined time during said reciprocating motion, and means for moving said slide in a predetermined direction along said guiding means when said electrode is held in engagement with the work.

4. Welding apparatus comprising a carrier, an actuator for reciprocating said carrier, a slide in said carrier, means for guiding said slide along a path transverse to the reciprocating movement of said carrier, an electrode supported on said slide and an actuator for said slide, said actuators being adjusted relatively to one another to move said slide in a predetermined direction along said guiding means when said electrode is held in engagement with the work for a predetermined interval of time by said carrier.

5. Welding apparatus comprising a reciprocating carrier, a slide in said carrier, means for guiding said slide transversely to the path of movement of said carrier, an electrode supported on said slide, means for moving said slide in one direction along said guiding means when said carrier has been moved toward the work and said electrode has been brought into contact with the work and for moving said slide in the opposite direction along said guiding means when said carrier has been moved from the work and said electrode has been lifted out of engagement with the work.

6. Apparatus comprising a reciprocating carrier, a slide in said carrier, means for guiding said slide transversely to the path of movement of said carrier, a shaft in said slide, a work engaging member on said shaft, means for propelling said slide along said carrier in opposite directions in response to the rotation of said shaft in opposite directions, and means for rotating said shaft in one direction when said carrier has been moved toward the work and said work engaging member is held in engagement with the work and for rotating said shaft in the opposite direction when said carrier has been moved from the work and said work engaging member has been lifted out of engagement with the work.

7. Welding apparatus comprising a reciprocating carrier, a slide in said carrier, means for driving said slide transversely to the path of movement of said carrier, a shaft in said slide extending at right angles to the path of movement of said slide, an electrode having a curved work engaging surface, means for supporting said electrode on said shaft with its work engaging surface in proximity to the work, means for adjusting said electrode in said supporting means relative to the work, a rack on said carrier extending in the direction of travel of said slide, a gear on said shaft in engagement with said rack, and means for rotating said shaft in one direction when said carrier has been moved toward the work and said electrode is held in contact with the work and for rotating said shaft in the opposite direction when said carrier has been moved from the work and said electrode has been lifted out of engagement with the work.

8. Welding apparatus comprising a reciprocating carrier, a slide in said carrier, means for guiding said slide transversely to the path of movement of said carrier, a shaft in said slide extending at right angles to the path of movement of said slide, an electrode having a curved work engaging surface, means for supporting said electrode on said shaft with its work engaging surface in priximity to the work, a rack on said carrier extending in the direction of travel of said slide, a gear on said shaft in engagement with said rack, and means for rotating said shaft in one direction when said carrier has been moved toward the work and said electrode is held in contact with the work and for rotating said shaft in the opposite direction when said carrier has been moved from the work and said electrode has been lifted out of engagement with the work.

9. Welding apparatus comprising a carrier, a slide in said carrier, means for guiding said slide transversely to the path of movement of said carrier, a shaft on said slide extending at right angles to the path of movement of said slide, a line welding electrode on said shaft, a rack on said carrier, extending in the direction of travel of said slide, a gear on said shaft in engagement with said rack, a rack bar movably supported in said carrier, a second gear on said shaft in driving engagement with the rack of said rack bar, means for moving said carrier to and from the work, and means connected to said last-mentioned means for moving said rack bar in one direction when said carrier has been moved toward the work and said electrode is held in contact with the work and for moving said rack bar in the opposite direction when said carrier has been moved from the work and said electrode has been lifted out of engagement with the work.

10. Welding apparatus comprising a reciprocating carrier, a slide in said carrier, means for guiding said slide transversely of the path of movement of said carrier, a shaft on said slide extending at right angles to the path of movement of said slide, a line welding electrode on said shaft, a rack on said carrier extending in the direction of travel of said slide, a gear on said shaft in engagement with said rack, a rack bar, means for supporting said rack bar in said carrier for movement in the direction of travel of said slide, a second gear on said shaft in driving engagement with the rack of said rack bar, a driving shaft, two cams on said shaft, cam followers for said cams, means for connecting one of said cam followers to said carrier, and means including a pivotally supported lever for connecting the other of said cam followers to said rack bar, said cams having configurations and being adjusted relatively to one another on said driving shaft periodically to move said electrode through the agency of said above-mentioned parts a predetermined distance along the work with which it is adapted to make engagement.

11. A welding machine comprising a carrier, a slide in said carrier, means for guiding said slide transversely to the path of movement of said carrier, anti-friction rollers between said slide and said guiding means, a shaft on said slide extending at right angles to the path of movement of said slide, a line welding electrode on said shaft, a rack on said carrier extending in the direction of travel of said slide, a gear on said shaft in engagement with said rack, a rack bar movably supported in said carrier, a second gear on said shaft in driving engagement with the rack of said rack bar, a driving shaft, two cams on said shaft, means for biasing said carrier into engagement with one of said cams, a lever, an adjustable fulcrum for said lever, and means for connecting said lever to said rack bar and to the other of said cams.

ROBERT T. GILLETTE.
LAURENCE R. LEVEEN.